United States Patent
Logvinskiy et al.

(10) Patent No.: US 11,080,755 B1
(45) Date of Patent: Aug. 3, 2021

(54) NATIVE ADVERTISEMENTS

(71) Applicant: Twitter, Inc., San Francisco, CA (US)

(72) Inventors: Boris Logvinskiy, San Francisco, CA (US); Andrew He, San Francisco, CA (US); Yuan Ren, San Francisco, CA (US); Kelcey Chan, San Francisco, CA (US); Nathan Shayefar, San Francisco, CA (US); Steffan Chartrand, San Francisco, CA (US); Michael Anderson, San Francisco, CA (US); Adam Morgenlender, San Francisco, CA (US)

(73) Assignee: Twitter, Inc., San Francisco, CA (US)

(*) Notice: Subject to any disclaimer, the term of this patent is extended or adjusted under 35 U.S.C. 154(b) by 623 days.

(21) Appl. No.: 15/099,455

(22) Filed: Apr. 14, 2016

Related U.S. Application Data

(60) Provisional application No. 62/147,462, filed on Apr. 14, 2015.

(51) Int. Cl.
  *G06Q 30/00* (2012.01)
  *G06Q 30/02* (2012.01)
  (Continued)

(52) U.S. Cl.
  CPC ..... *G06Q 30/0267* (2013.01); *G06Q 30/0247* (2013.01); *G06Q 30/0275* (2013.01);
  (Continued)

(58) Field of Classification Search
  None
  See application file for complete search history.

(56) References Cited

U.S. PATENT DOCUMENTS 7,752,202 B2  7/2010 Kobori et al.
8,667,532 B2 * 3/2014 Heath .................. H04N 21/812
                                                        725/36
(Continued)

FOREIGN PATENT DOCUMENTS

JP     07021159 A  *  1/1995  ............. G06F 17/21
JP     H0721159 A     1/1995
(Continued)

OTHER PUBLICATIONS

Google Ads Help. Choose an ad format. (Jan. 10, 2013). Retrieved online Feb. 29, 2020. https://support.google.com/google-ads/answer/1722124?hl=en (Year: 2013).*

(Continued)

*Primary Examiner* — James A Reagan
(74) *Attorney, Agent, or Firm* — Smith Baluch LLP

(57) ABSTRACT

A method for operating a server system. The method includes: receiving, by the server system, a request for a plurality of assets in a first format to fill an ad unit, in an application executing on a mobile device, with a native advertisement; receiving, by the server system and from an ad source over a network, ad content in a second format; converting, by a converter of the server system, the ad content in the second format to the plurality of assets in the first format; and sending, by the server system, the plurality of assets to the application, where the application fills the ad unit with the native advertisement including at least one of the plurality of assets.

26 Claims, 8 Drawing Sheets

(51) Int. Cl.
*H04W 4/18* (2009.01)
*H04M 1/72445* (2021.01)

(52) U.S. Cl.
CPC .... *G06Q 30/0277* (2013.01); *H04M 1/72445* (2021.01); *H04W 4/18* (2013.01)

(56) References Cited

U.S. PATENT DOCUMENTS

| | | | | |
|---|---|---|---|---|
| 9,549,227 | B2 * | 1/2017 | Campbell | H04L 65/4084 |
| 10,152,731 | B1 * | 12/2018 | Cselle | G06Q 30/0277 |
| 10,275,804 | B1 | 4/2019 | Cselle et al. | |
| 10,943,270 | B1 * | 3/2021 | Cselle | G06Q 30/0277 |
| 2007/0061300 | A1 | 3/2007 | Ramer et al. | |
| 2008/0215428 | A1 | 9/2008 | Ramer et al. | |
| 2009/0222329 | A1 * | 9/2009 | Ramer | G06Q 30/0254 705/14.52 |
| 2009/0248524 | A1 * | 10/2009 | Defoy | G06Q 30/02 705/14.1 |
| 2011/0055209 | A1 * | 3/2011 | Novac | G06Q 30/02 707/737 |
| 2011/0258046 | A1 | 10/2011 | Ramer et al. | |
| 2011/0258049 | A1 * | 10/2011 | Ramer | G06Q 30/0273 705/14.66 |
| 2012/0027816 | A1 | 2/2012 | Kusumba et al. | |
| 2012/0059708 | A1 * | 3/2012 | Galas | G06Q 30/0244 705/14.43 |
| 2012/0278164 | A1 * | 11/2012 | Spivack | G06F 16/951 705/14.52 |
| 2013/0055097 | A1 * | 2/2013 | Soroca | G06F 16/9577 715/738 |
| 2013/0159431 | A1 | 6/2013 | Berry et al. | |
| 2013/0198331 | A1 * | 8/2013 | Ho | H04L 67/10 709/217 |
| 2013/0304581 | A1 * | 11/2013 | Soroca | G06Q 30/0267 705/14.64 |
| 2014/0011562 | A1 | 1/2014 | Smith et al. | |
| 2014/0055803 | A1 * | 2/2014 | Uhlig | G06F 40/14 358/1.13 |
| 2014/0067542 | A1 * | 3/2014 | Everingham | G06Q 30/0241 705/14.64 |
| 2014/0068692 | A1 * | 3/2014 | Archibong | H04N 21/23424 725/116 |
| 2014/0115625 | A1 * | 4/2014 | McCoy | H04N 21/8455 725/34 |
| 2014/0282126 | A1 * | 9/2014 | Ma | G06F 8/34 715/762 |
| 2016/0050465 | A1 * | 2/2016 | Zaheer | H04N 21/6581 725/34 |
| 2016/0104201 | A1 * | 4/2016 | Greenberg | G06Q 30/0267 705/14.64 |
| 2017/0011418 | A1 * | 1/2017 | Denton | G06F 3/0485 |

FOREIGN PATENT DOCUMENTS

| | | | | |
|---|---|---|---|---|
| JP | 2003091476 A | | 3/2003 | |
| WO | 2010003129 A2 | | 1/2010 | |
| WO | WO-2010003129 A2 | * | 1/2010 | ........... G06F 16/334 |
| WO | WO-2010123242 A2 | * | 10/2010 | ........... G06F 40/186 |

OTHER PUBLICATIONS

Google Maps Platform. Autocomplete for Addresses and Search Terms. (Oct. 8, 2013). Retrieved online Dec. 27, 2020. https://developers.google.com/maps/documentation/javascript/places-autocomplete (Year: 2013).*

Queen's University Belfast. IT Training and Assessment Unit. (Jun. 2012). Retrieved online Dec. 27, 2020 https://www.qub.ac.uk/directorates/media/Media,300678,en.pdf (Year: 2012).*

Mobile Marketing Association. Rich Media Mobile Advertising Guidelines. (Feb. 8, 2011). Retrieved online Dec. 29, 2020. https://www.mmaglobal.com/files/rmma.pdf. (Year: 2011).*

"Making best use of Outlook 2010 using Microsoft Exchange," IT Training and Assesment Unit, Queen's University Belfast. accessed from https://www.qub.ac.uk/directorates/media/Media.300678.en.pdf, Jun. 2012, 2 pages.

Amendment in Response to Office Action dated Jun. 23, 2017, from U.S. Appl. No. 14/561,984, filed Nov. 24, 2017, 25 pp.

Hemley, "26 Tips to Create a Strong Social Media Content Strategy," accessed from https://www.socialmediaexaminer.com/26-tips-to-create-a-strong-social-media-content-strategy/, Jun. 25, 2013, 35 pp.

U.S. Appl. No. 16/398,021, filed Apr. 29, 2019, naming inventors Cselle et al.

Office Action from U.S. Appl. No. 14/561,984, dated Jun. 23, 2017, 20 pp.

Prosecution History from U.S. Appl. No. 14/561,984, dated Nov. 10, 2016 through Mar. 19, 2019, 259 pp.

Prosecution History from U.S. Appl. No. 14/562,012, dated Nov. 10, 2016 through Mar. 19, 2019, 259 pp.

U.S. Appl. No. 14/561,984, by Gabor Cselle, filed Dec. 5, 2014.

U.S. Appl. No. 16/215,309, filed Dec. 10, 2018, naming inventors Cselle et al.

Autocomplete for Addresses and Search Terms. Google Oct. 8, 2013. Accessed at https://developers.google.com/maps/documentation/javascript/places-autocomplete, 22 pages.

* cited by examiner

| Asset | Description | Notes | Sample Value |
|---|---|---|---|
| title | Main title for the ad, e.g. game name | 25 char max | Words With Friends |
| text | Text for the ad | 100 char max | Keep in touch with your friends by playing Words With Friends, the #1 Free iPhone game of all time! |
| iconimage | URL for the location of the app icon | 80x80 | https://sampleapp.com/img/wordswithfriends.png |
| mainimage | Large image for larger format ads. | 1200x627 | https://sampleapp.com/img/wordswithfriends.png |
| ctatext | Call to action text | | Install |
| clk | Click URL destination URL | Entered in UI and generated by MoPub | https://itunes.apple.com/us/app/words-with-friends/id322852954?mt=8 |
| imptracker | Array of impression tracking URLs | | ["http://ads.mopub.com/m/imp?2789272","http://ads.example.com/imp?id=32144123"] |
| clktracker | Click tracking URL | | http://ads.mopub.com/m/aclk?189082828 |

Asset Table 401

*FIG. 4*

NATIVE ADVERTISEMENTS

CROSS-REFERENCE TO RELATED APPLICATIONS

This application is a non-provisional application of U.S. Provisional Patent Application Ser. No. 62/147,462, filed on Apr. 14, 2015. Accordingly, this application claims priority to U.S. Provisional Patent Application Ser. No. 62/147,462 under 35 U.S.C. § 119(e). U.S. Provisional Patent Application Ser. No. 62/147,462 is hereby incorporated by reference in its entirety.

BACKGROUND

An increasing number of companies, agencies, individuals, and other parties (collectively "advertisers") use online advertising to promote their products and services. An advertiser purchases advertising space from an individual publisher, an advertising network, or an advertising exchange that distributes advertisements to one or more publishers. A publisher may display advertisements in several formats depending on the platform the publisher uses to interface with the consuming public.

Native ads are a type of advertisement typically customized to better blend with the computing environment in which they are displayed. For example, content of native ads are typically displayed in a color palette and font consistent with the graphical user interface of an application in which the former is displayed.

However, different advertisers often provide content for a native ad in different formats. It is burdensome for a publisher to deal with these multiple formats. Regardless, the desire for native ads remains strong.

SUMMARY

Embodiments include a converter that transforms ad content, in variety of formats and from a variety of sources, into a set of expected ad assets in an expected format, thereby allowing the ad content to be displayed as native ads for a particular application. These ad assets are used by a publisher of a mobile application to fill an ad unit in the application (discussed below) with a native advertisement. Specifically, the publisher may select to include or omit one or more of the ad assets, dictate the layout of the ad assets, dictate one or more attributes of the ad assets (e.g., font, background color, etc.). The converter may be located on the mobile device itself and/or on an ad server system. The ad sever system may select the ad source to increase revenue for the publisher.

In general, in one aspect, embodiments relate to a method for operating a server system. The method comprises: receiving, by the server system, a request for a plurality of assets in a first format to fill an ad unit, in an application executing on a mobile device, with a native advertisement; receiving, by the server system and from an ad source over a network, ad content in a second format; converting, by a converter of the server system, the ad content in the second format to the plurality of assets in the first format; and sending, by the server system, the plurality of assets to the application, wherein the application fills the ad unit with the native advertisement comprising at least one of the plurality of assets.

In general, in one aspect, embodiments relate to a method for operating a mobile device. The method comprises: issuing, by a server system SDK executing on the mobile device, a request for a plurality of assets in a first format to fill an ad unit, in an application, with a native advertisement; receiving, by the server system SDK and from a server system, an identity of an advertisement (ad) network; issuing, by an SDK of the ad network executing on the mobile device and based on the identity received from the server system, a content request to the ad network for the plurality of assets; receiving, by the SDK of the ad network, ad content in a second format from the ad network; converting, by a converter executing on the mobile device, the ad content in the second format to the plurality of assets in the first format; and filling the ad unit with the native advertisement comprising at least one of the plurality of assets.

In general, in one aspect, embodiments relate to a server system. The server system comprises: a computer processor; and a converter executing on the computer processor that: receives a request for a plurality of assets in a first format to fill an ad unit, in an application executing on a mobile device, with a native advertisement; receives, from an ad source and over a network, ad content in a second format; converts the ad content in the second format to the plurality of assets in the first format; and sends the plurality of assets to the application, wherein the application fills the ad unit with the native advertisement comprising at least one of the plurality of assets.

In general, in one aspect, embodiments relate to a mobile device. The mobile device comprises: a server system SDK, executing on the mobile device, that: issues a request for a plurality of assets in a first format to fill an ad unit, in an application executing on the mobile device, with a native advertisement; receives, from a server system, an identity of a first advertisement (ad) network; and converts, using a converter executing on the mobile device, ad content in a second format to the plurality of assets in the first format; and an SDK of the first ad network, executing on the mobile device, that: issues based on the identity received from the server system, a content request to the first ad network for the plurality of assets; and receives the ad content in the second format from the first ad network, wherein the ad unit is filled with the native advertisement comprising at least one of the plurality of assets.

In general, in one aspect, embodiments relate to a non-transitory computer-readable medium (CRM) storing instructions for operating a server system. The server system: receives a request for a plurality of assets in a first format to fill an ad unit, in an application executing on a mobile device, with a native advertisement; receives, from an ad source over a network, ad content in a second format; converts, by a converter of the server system, the ad content in the second format to the plurality of assets in the first format; and sends, by the server system, the plurality of assets to the application, wherein the application fills the ad unit with the native advertisement comprising at least one of the plurality of assets.

BRIEF DESCRIPTION OF DRAWINGS

FIG. 4 shows a table identifying multiple assets in accordance with one or more embodiments of the invention.

DETAILED DESCRIPTION

Figure 1A:
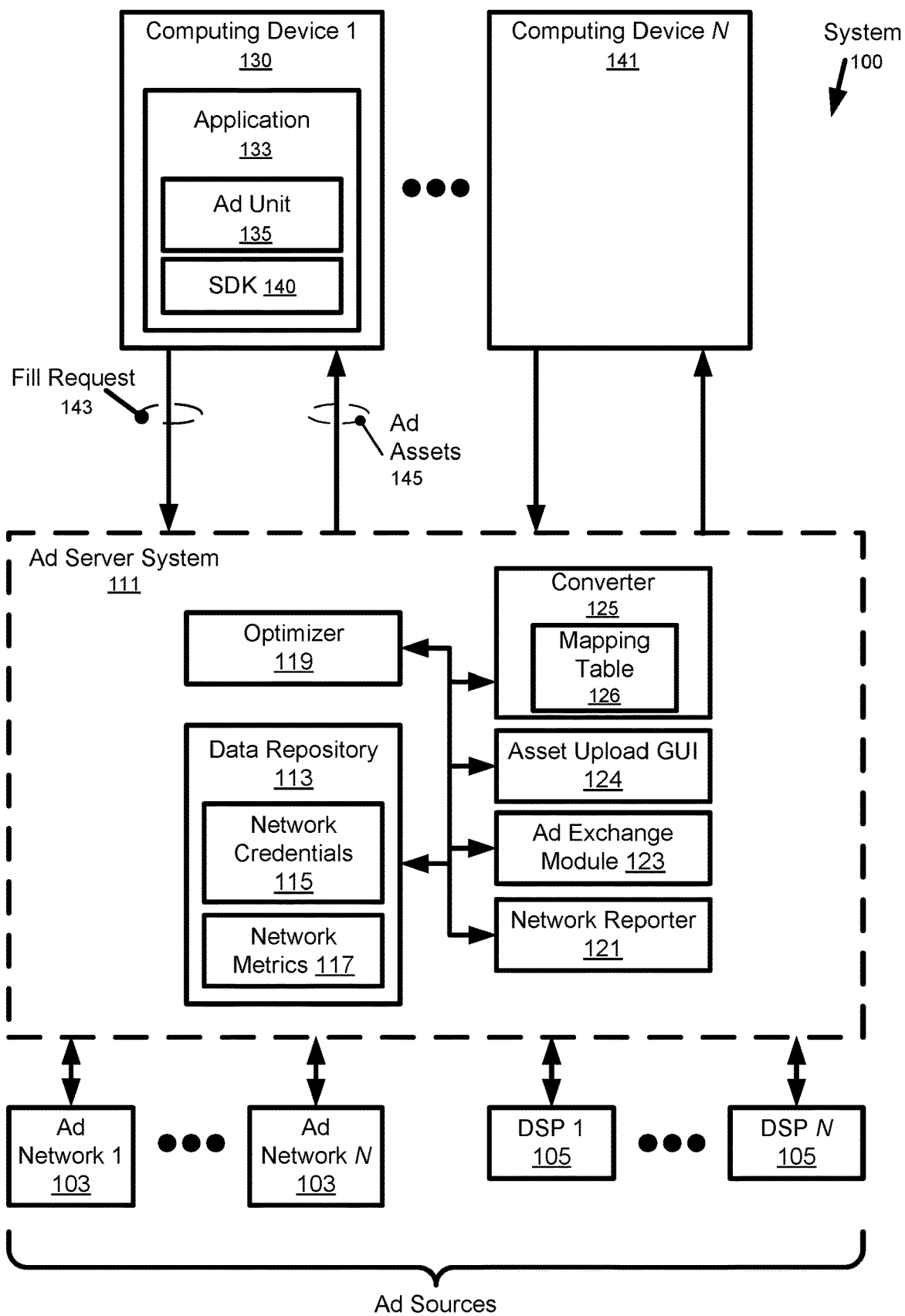
FIG. 1A and FIG. 1B show systems in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, according to one or more embodiments of the invention, ad content is received in different formats from different ad sources. An advertising server ("ad server") system may convert the ad content into assets having a common or standard format. These assets are then sent to the requesting application and are used to generate a native ad to populate an ad unit displayed within the application.

FIG. 1A shows a system in accordance with one or more embodiments of the invention. As shown in FIG. 1A, the system (100) has multiple components including one or more computing devices (130, 141) executing one or more applications (133), one or more ad sources (e.g., one or more ad networks (103) and/or demand-side platforms (DSP) (105)), and an ad server system (111) including a data repository (113) storing network credentials (115) and network metrics (117), an optimizer (119), a network reporter (121), a converter (125), as asset upload GUI (124), and an ad exchange module (123). Each of these components is described below.

In one or more embodiments of the invention, each computing device (130, 141) is a desktop personal computer (PC), a laptop, a tablet computer, an electronic reader (e-reader), a cable box, a kiosk, a smart phone, a server, a mainframe, a personal digital assistant (PDA), or any other type of hardware device. Each computing device (130, 141) includes one or more processors and memory to execute one or more applications. The computing devices (130, 141) may communicate with the ad server system (111) using wired and/or wireless (e.g., wifi, cellular, etc.) connections.

In one or more embodiments of the invention, the application (133) is a software application of any type (e.g., operating system, messaging application, social networking application, game, word processing application, web browser, etc.). The application (133) is developed and/or owned by a publisher. As shown in FIG. 1A, the application (133) is implemented to include one or more ad units(s) (135). An ad unit (135) is a predefined space in an application used to display one or more native advertisements. Although FIG. 1A only shows the application (135) as having one ad unit (135), the application (133) may have any number of ad units (135).

In one or more embodiments of the invention, a native advertisement is composed of one or more assets and is designed to blend in (i.e., similar look and feel, color, font, background, size, etc.) with content displayed close to the ad unit (135). The one or more assets are provided to the application (133) during execution of the application (133). New/updated assets may be provided to the application at any time during the execution of the application (133). In other words, the native advertisement being displayed in the ad unit (135) may change over time.

In one or more embodiments of the invention, the publisher is able to create the ad unit (135) and specify the types of assets to appear in the native advertisement that will populate/fill the ad unit (135) using a software development kit (SDK) (140). In other words, the SDK (140) offers the publisher assets in a standard format, and the publisher is able to select one or more of the offered assets for inclusion in the native advertisement. Moreover, the publisher can dictate the layout of the assets and some attributes (e.g., background color, font, etc.) of the assets to blend with the rest of the application (133). These assets are in contrast to traditional advertisements (e.g., banners), where an unalterable WebView of an ad is provided for display in the application. FIG. 4 shows an asset table (401) in accordance with one or more embodiments of the invention. The asset table (401) specifies five standard assets (e.g., title, text, iconimage, mainimage, ctatext, etc.) that may be selected by the publisher and used to create a native advertisement to populate/fill an ad unit (135). The asset table (401) also specifies three helper assets (i.e., clk, imptracker, clktracker) that are included in every native advertisement (e.g., the native advertisement that will populate the ad unit (135)). These helper assets specify the destination of the native advertisement (i.e., where the user should be taken if the user clicks on the native advertisement) and tracking URLs for the user actions of both viewing the native advertisement and clicking on the native advertisement. The assets identified in FIG. 4 are only examples. In fact, one optional asset is the starrating asset (not shown). The starrating asset is a star rating of the application being advertised. It takes on values between 0 and 5. In one or more embodiments, although not shown in FIG. 4, the assets include video clips and/or audio clips.

In one or more embodiments of the invention, the SDK (140) or a different SDK is deployed with the application (133). During execution of the application (133), the SDK (140) may issue a fill request (143) to the ad server system (111). The fill request (143) is effectively a request for assets from the ad server system (111) in order to generate a native advertisement and populate the ad unit (135) with the native advertisement. The fill request (143) may take the form of a URL hit. Moreover, the fill request (143) may include one or more parameters including an identification of the ad unit (135), an identification of the computing device (130), the version of the SDK (140), one or more keywords, a type of content (e.g., sports, cars, pets, vacations, clothes, etc.) displayed around the ad unit (135), a type of connection (e.g., wifi, cellular, etc.) between the computing device (130) and the ad server system (111), etc.

In one or more embodiments of the invention, the fill request (143) is for all offered assets, even if one or more of the assets have not been selected by the publisher and are not required to generate the native advertisement. In one or more embodiments, the fill request (143) specifies only the assets selected by the publisher and needed to generate the native advertisement. The assets (145) are received in response to the fill request (143). The assets (145) are derived from ad content provided by an ad source (discussed below). In other words, the ad content is provided to fill the ad unit (135).

In one or more embodiments of the invention, the ad sources (103, 105) provide ad content to the ad server system (111). Different ad sources (103, 105) may provide ad content in different formats. Further, the ad content provided by an ad source (103, 105) may be in a format that is different than the format of the assets required/requested to generate a native advertisement to populate the ad unit (135).

In one or more embodiments of the invention, an ad network(s) (103) is service that connects advertisers to publishers of applications. The key function of an ad network is matching publishers' ad unit supply with advertiser demand.

In one or more embodiments of the invention, an ad network (103) may charge the advertiser using one of several metrics, including online marketing Key Performance Indicators (KPIs) such as cost-per-click (CPC) and cost-per-impression (CPM). In a CPC system, an advertiser is charged based on the number of times that users click on a native advertisement composed of assets derived from ad content of the advertiser; in other words, an advertiser is not charged when a publisher displays the native advertisement to a user unless the user clicks on the native advertisement. In a CPM system, an advertiser is charged based on the number of times a publisher displays the native advertisement to a user.

In one or more embodiments of the invention, an ad network (103) may be configured to communicate with external entities including, without limitation, applications (101), ad servers, ad exchanges, and/or the ad server system (111).

Ad servers may be configured to perform a variety of functions including metric tracking (e.g., number of clicks and number of impressions served) and report generation, both for publishers and for advertisers.

Publisher ad servers may be run by a single publisher and serve ads to that publisher's applications, allowing fine-grained creative, formatting, and content control by that publisher. Third-party ad servers may serve ads across domains owned by multiple publishers and deliver the ads from a central source to facilitate advertiser and publisher tracking.

An ad exchange is a platform that allows real-time bidding (RTB) on publishers' ad units by ad networks (103), demand-side platforms (105), and/or individual advertisers. Using an ad exchange, publishers may auction their inventory to the highest bidder through a single interface. However, many ad networks (103) are not configured to utilize ad exchange APIs for real-time bidding and are thereby excluded from the RTB process.

In one or more embodiments of the invention, demand-side platform(s) ("DSPs") (105) allow advertisers to manage multiple ad exchange accounts through one interface. By utilizing a DSP, advertisers can manage and optimize their bids based on KPIs. DSPs typically combine similar functionality to ad networks (103) with the ability to make real-time bids using ad exchange APIs.

In one or more embodiments of the invention, the data repository (113) is any type of storage unit and/or device (e.g., a file system, database, collection of tables, or any other storage mechanism) for storing data. Further, the data repository may include multiple different storage units and/or devices. The multiple different storage units and/or devices may or may not be of the same type or located at the same physical site.

In one or more embodiments of the invention, the data repository (113) is configured to store network credentials (115), network metrics (117), and/or any other data relevant to internet marketing, advertisement networks, or advertisement exchanges. Network credentials (115) include user credentials (e.g., usernames and passwords) used by publishers or third parties to interface with an ad network's services. A publisher's network credentials may be obtained from the publisher directly.

Network metrics (117) may include typical online marketing KPIs and other metrics obtained from publishers, ad networks, and/or other entities, including CPC, CPM, and click-through-rate (CTR) (i.e., number of clicks divided by number of impressions served for a given advertisement). The metrics may include, without limitation, geographic data (e.g., CTR by country), time data (e.g., CTR by hour), platform data (e.g., CTR by operating system), and ad unit data (e.g., CTR by ad type).

In one or more embodiments of the invention, the ad server system (111) is configured to communicate with applications (101), ad networks (103), DSPs (105), and/or other entities in order to facilitate serving assets to applications in response to fill requests. The ad server system may also include functionality typically provided by ad servers in general and as already described. The ad server system may include functionality to receive, store, and deliver assets to applications and publisher ad servers. The ad server system may include functionality to track KPIs or other metrics for publishers and generate related reports. The ad server system may also include functionality to request data from and store data to the data repository (113). The ad server system (111) and all elements in the ad server system (111) (e.g., converter (125)) may be implemented in hardware (e.g., circuitry), software, or any combination thereof.

In one or more embodiments of the invention, the optimizer (119) may include functionality to receive fill requests from applications and publisher ad servers. The optimizer may include functionality to send received fill requests to ad networks and/or other entities.

In one or more embodiments of the invention, the optimizer may include functionality for generating a model for calculating expected publisher revenue (e.g., eCPM) from an ad network, in the event the ad network successfully fills the publisher's ad unit with ad content. The model may be generated based on one or more metrics measuring past performance of ad networks with respect to the either the individual publisher or publishers in aggregate. The model may be generated based on CPM for ad networks that report CPM, or the model may be generated based on a combination of CPC and CTR for ad networks that report CPC. The metrics may be obtained from the data repository (113) or directly from the ad networks using the network reporter (121) described below. In another embodiment of the invention, the optimizer may obtain the model from another entity within or external to the ad server system (111).

In one or more embodiments of the invention, the optimizer (119) includes functionality to determine an optimal ordering for the waterfall of ad networks based on at least the estimated publisher revenue calculated using the above-mentioned model. The ordering may be determined so that ad networks expected to generate more revenue for a particular fill request are prioritized to receive the request. The ordering may also be determined based on additional factors including ad networks' respective fill rates (the rate at which an ad network successfully serves ad content to fill an ad unit), geographic data, time data, platform data, and/or ad unit data.

In one or more embodiments of the invention, the optimizer (119) may be configured to send a particular fill request to the first network in the ordering first. If the first network does not successfully serve ad content in response to the request, the fill request may then be sent to the second network in the ordering, and so on until an ad network responds by serving ad content (to the optimizer (119) or to the publisher directly).

In one or more embodiments of the invention, the network reporter (121) may include functionality to access ad network reporting information through the networks' respective APIs, websites, and/or other methods of communication. A given ad network's reporting information may include one or more KPIs or any other metric for measuring the ad network's performance history. In the case of web access, the network reporter may be configured to scrape an ad network's website to obtain the desired metrics. The network reporter may include functionality to obtain credentials from publishers and/or other entities used to access the ad networks. The network reporter may additionally store credentials in and obtain credentials from the data repository (113).

In one or more embodiments of the invention, the network reporter (121) may include functionality to generate a report for a publisher based on metrics obtained from the ad networks and/or based on the performance of the optimizer for previously served fill requests.

In one or more embodiments of the invention, the ad exchange module (123) may include functionality to operate an ad exchange or interface with a third-party ad exchange. The ad exchange module may include functionality to assign proxy bids to one or more ad networks for use in a RTB process (in the case where an ad network is unable to participate in an ad exchange directly). A proxy bid assigned by the ad exchange module to an ad network may be based on the ad network's estimated publisher revenue, calculated by the optimizer using the model. A proxy bid may also be assigned to an ad network using values input directly from the publisher.

The ad exchange module (123) may include functionality to obtain one or more actual bids corresponding to one or more DSPs. The ad exchange module may then perform a RTB auction using, or provide to a third-party ad exchange, proxy bids for ad networks and/or actual bids for DSPs in order to determine the highest bidder for a publisher's fill request.

The converter (125) is configured to convert the ad content from an ad source, provided to the ad server system (111) in a format specific to the ad source, into the format of the assets requested/required to generate a native advertisement to populate the ad unit (135). In other words, although ad content may come from a variety of ad sources and be in any number of formats, the output of the converter (125) is the expected ad assets in their expected format. Some or all of the assets, as specified/selected/formatted by the publisher, are used to form the native advertisement that fills the ad unit (135). This is in contrast to traditional advertisements, in which there is no transformation or conversion and an unalterable WebView of an ad is provided for display in the application (133). Converting may include removing, reordering, merging, grouping, etc. data (i.e., ad content) provided by the ad source. As shown in FIG. 1A, the converter (125) includes a mapping table (126) that identifies/specifies the relationship between the format specific to each ad source and the format of the assets. If the asset is a video or audio clip, conversion of the asset might not be necessary.

The asset upload GUI (124) enables publishers to easily upload assets directly into the ad server system (111). Specifically, a publisher may have direct advertising agreements with one or more companies. The companies may provide the assets directly to the publishers. The publisher may then upload the assets to the ad server system (111) by manipulating the widgets of the asset upload GUI (124). The uploaded assets may be provided to the application (133) in response to the fill request (143).

While FIG. 1A shows a configuration of components, other configurations may be used without departing from the scope of the invention. For example, various components may be combined to create a single component. As another example, the functionality performed by a single component may be performed by two or more components.

The invention is not limited to the system shown in FIG. 1A.

Figure 1B:
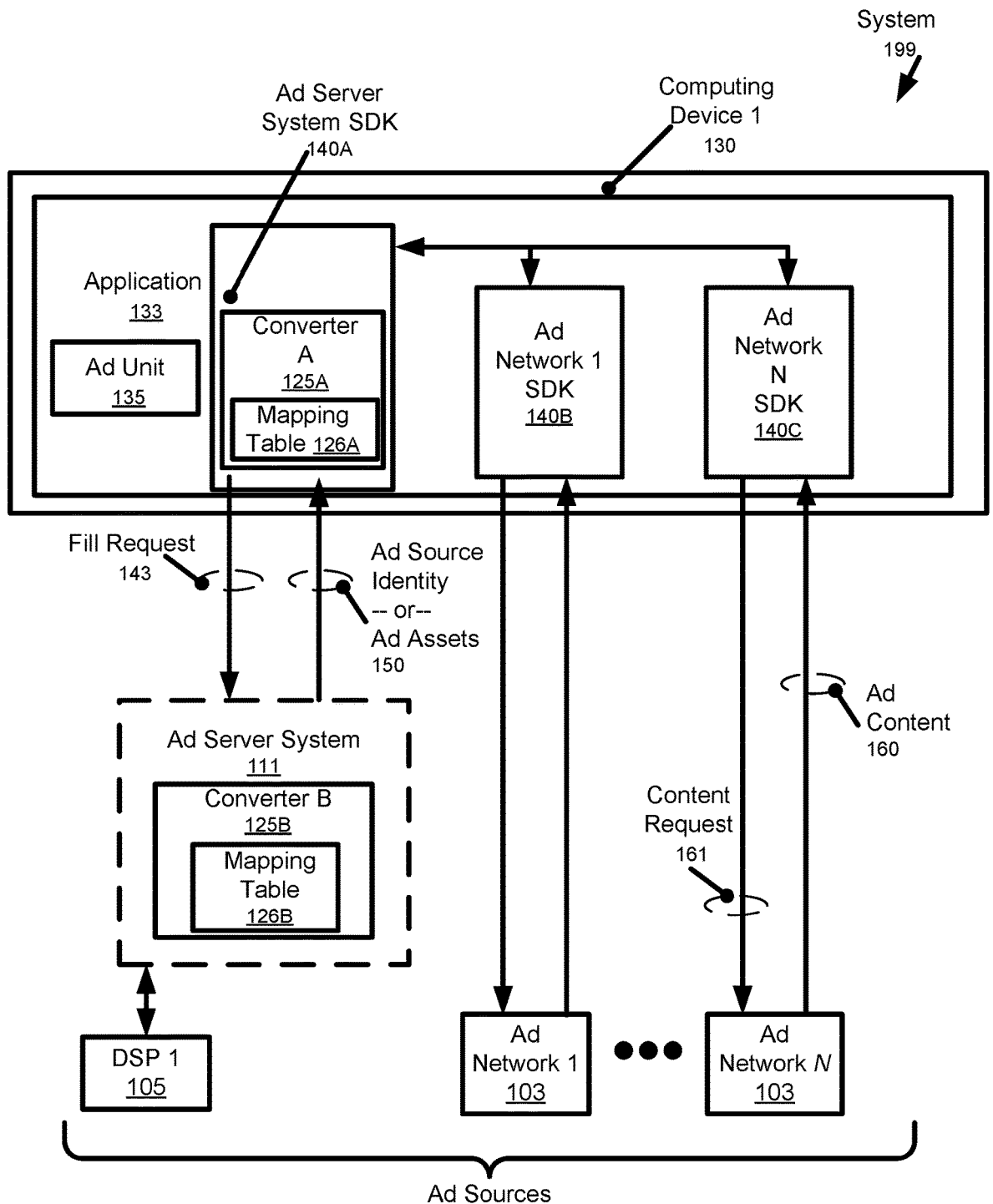

FIG. 1B shows a system (199) in accordance with one or more embodiments of the invention. The system (199) has several similarities with system (100), discussed above in reference to FIG. 1A. For example, system (199) includes computing device 1 (130), ad server system (111), and multiple ad sources (e.g., DSP 1 (105), Ad Network 1 (103), Ad Network N (103)). As another example, computing device 1 (130) is executing the application (133) that has the ad unit (135).

In one or more embodiments of the invention, the application (133) includes multiple SDKs (e.g., Ad Server System SDK (140A), Ad Network 1 SDK (140B), Ad Network N SDK (140C)). Specifically, ad server system SDK (140A) communicates with the ad server system (111), while each of the remaining SDKs (140B, 140C) communicates with one of the ad networks (103). For example, ad network 1 SDK (140B) communicates with ad network 1 (103), while ad network N SDK (140C) communicates with ad network N (103). The ad server system SDK (140A) also communicates with the other SDKs (140B, 140C).

During execution of the application (133), the ad server system SDK (140A) may issue a fill request (143) to the ad server system (111). The fill request (143) is effectively a request for assets from the ad server system (111) in order to generate a native advertisement and populate the ad unit (135) with the native advertisement. The fill request (143) may take the form of a URL hit. Moreover, the fill request (143) may include one or more parameters including an identification of the ad unit (135), an identification of the computing device (130), the version of the SDK (140), one or more keywords, a type of content (e.g., sports, cars, pets, vacations, clothes, etc.) displayed around the ad unit (135), a type of connection (e.g., wifi, cellular, etc.) between the computing device (130) and the ad server system (111), etc.

In one or more embodiments of the invention, the fill request (143) is for all offered assets, even if one or more of the assets have not been selected by the publisher and are not required to generate the native advertisement. In one or more embodiments, the fill request (143) specifies only the assets selected by the publisher and needed to generate the native advertisement. The ad server system (111) may select an ad source (103, 105) to supply the assets using any process described above in reference to FIG. 1A. If the selected ad source is an ad network (103), the identity of the ad source (i.e., ad source identity (150)) is returned to the ad server system SDK (140A) in response to the fill request (143). If the selected ad source is a DSP (105), the assets (150) are returned to the ad server system SDK (140A) in response to the fill request. The assets (150) are derived from ad content provided by the selected DSP (105) (discussed below).

Figure 1C:
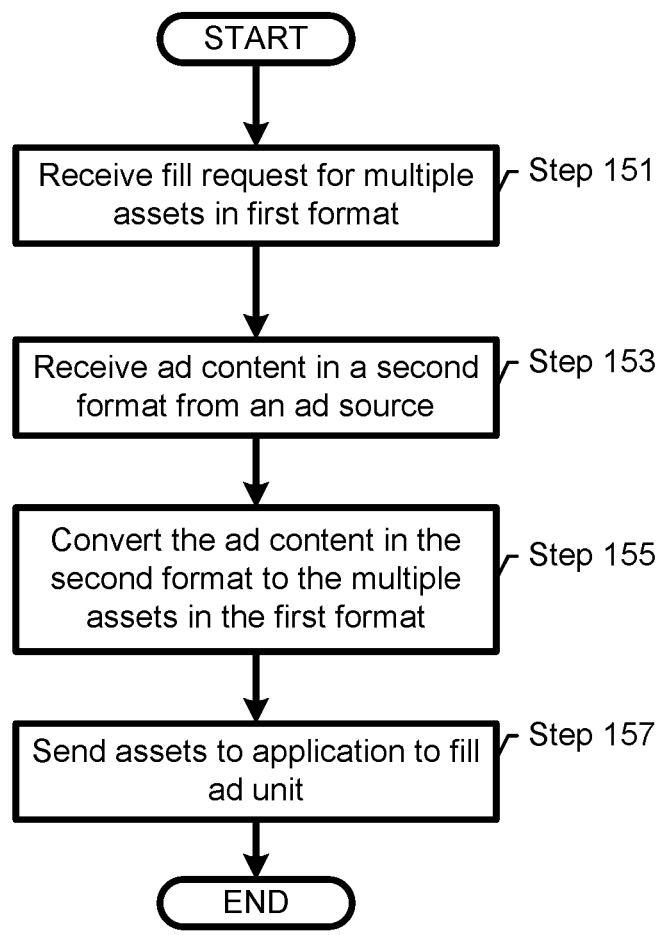
FIG. 1C shows a flowchart in accordance with one or more embodiments of the invention.

In one or more embodiments of the invention, if a DSP is selected, the converter (125B) is configured to convert the ad content from the selected DSP, provided to the ad server system (111) in a format specific to the selected DSP (or a format common to all DSPs), into the format of the assets requested/required to generate a native advertisement to populate the ad unit (135). Converting may include removing, reordering, merging, grouping, etc. data (i.e., ad content) provided by the selected DSP. As shown in FIG. 1C, the converter (125B) includes a mapping table (126B) that identifies/specifies the relationship between the format specific to each DSP (or a format common to all DSPs) and the format of the assets.

As discussed above, if an ad network (103) is selected by the ad server system (111) in response to the fill request (143), the identity of the ad network (150) is returned to the ad server system SDK (140A). Based on the ad source identity (150), the ad network SDK (140B, 140C) of the selected ad network (103) then issues a content request (161) to the selected ad network (103). In response to the content request (161), the ad network (103) returns ad content (160) in a format specific to the ad network (103). The converter (125A) in the ad server system SDK (140A) is configured to convert the ad content (160) from the selected ad network, provided to the ad network SDK (140B, 140C) in the format specific to the selected ad network, into the format of the assets requested/required to generate a native advertisement to populate the ad unit (135). Converting may include removing, reordering, merging, grouping, etc. data (i.e., ad content) provided by the selected ad network. As shown in FIG. 1C, the converter (125A) includes a mapping table (126A) that identifies/specifies the relationship between the format specific to each ad network and the format of the assets.

Those skilled in the art, having the benefit of this detailed description, will appreciate that the system (199) has two converters: converter A (125A) and converter B (125B). Converter B (125B) is located in the ad server system (111) and converts ad content provided by a selected DSP into the format of the assets requested/required to generate a native advertisement to populate the ad unit (135). In contrast, converter A (125A) is located in the ad server system SDK (140A) and converts ad content provided by a selected ad network (103) into the format of the assets requested/required to generate a native advertisement to populate the ad unit (135). Both converters (125A, 125B) may be implemented in hardware (i.e., circuitry), software, or any combination thereof.

In one or more embodiments, the ad networks (103) might be unable (e.g., incompatible with) or unwilling to provide the ad content (160) directly to the ad server system (111). Instead, the ad networks (103) only provide ad content (160) to their respective ad network SDK (140B, 140C). By including the ad network SDKs (140B, 140C) in the application (133), the publisher is able to utilize ad content from various ad sources, even ad sources that are not directly compatible with the ad server system (i.e., ad networks that do not provide ad content directly to the ad server system (111)). Moreover, the system (199) still enables the ad server system (111) to select the ad source in response to the fill request (143).

FIGS. 1C, 2A, 2B, and 3 show flowcharts in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel.

FIG. 1C shows a flowchart for managing a native advertisement in accordance with one or more embodiments of the invention. The process shown in FIG. 1B may be used, for example, with the system (100) of FIG. 1A or the system (199) of FIG. 1B.

Initially, a fill request for multiple assets in a first format is received from an application (Step 151). The fill request may be issued by an ad server system SDK in the application and received by an ad server system. The assets will eventually be used to generate a native advertisement to populate an ad unit within the application. The fill request may include one or more parameters including an identification of the ad unit, an identification of the computing device executing the application, the version of the SDK in the application, one or more keywords, a type of content (e.g., sports, cars, pets, vacations, clothes, etc.) displayed around the ad unit, a type of connection (e.g., wifi, cellular, etc.) between the computing device and the ad server system (111), etc.

In Step 153, ad content in a second format (i.e., a format different than the requested assets) is received from an ad source. The ad source may be selected according to the process set forth in FIG. 2A or FIG. 2B. The fill request (or at least one or more parameters of the fill request) may be sent to the ad source. The ad source may select ad content based on the parameter(s). In one or more embodiments of the invention, if the selected ad source is a DSP, the ad content is received by the ad server system from the DSP. In one or more embodiments of the invention, if the selected ad source is an ad network, the identity of the selected ad network is returned to the ad server system SDK and the ad content is received by the ad network SDK in the application that communicates with the selected ad network.

In Step 155, the ad content received from the ad source is converted into the format of the required/requested assets. Converting may include removing, reordering, merging, grouping, etc. data (i.e., ad content) provided by the ad source. Converting may include accessing a mapping table identifying/specifying the relationship between the format specific to the ad source and the format of the assets. In one or more embodiments of the invention, if the selected ad source is a DSP, the converter in the ad server system performs the converting, and the resulting assets are returned to the ad server system SDK. In one or more embodiments of the invention, if the selected ad source is an ad network, the converter in the ad server system SDK performs the converting.

In Step 157, the requested assets are used to fill the ad unit. Specifically, a native advertisement will be generated from the assets and the ad unit will be populated with the native advertisement.

Figure 2A:
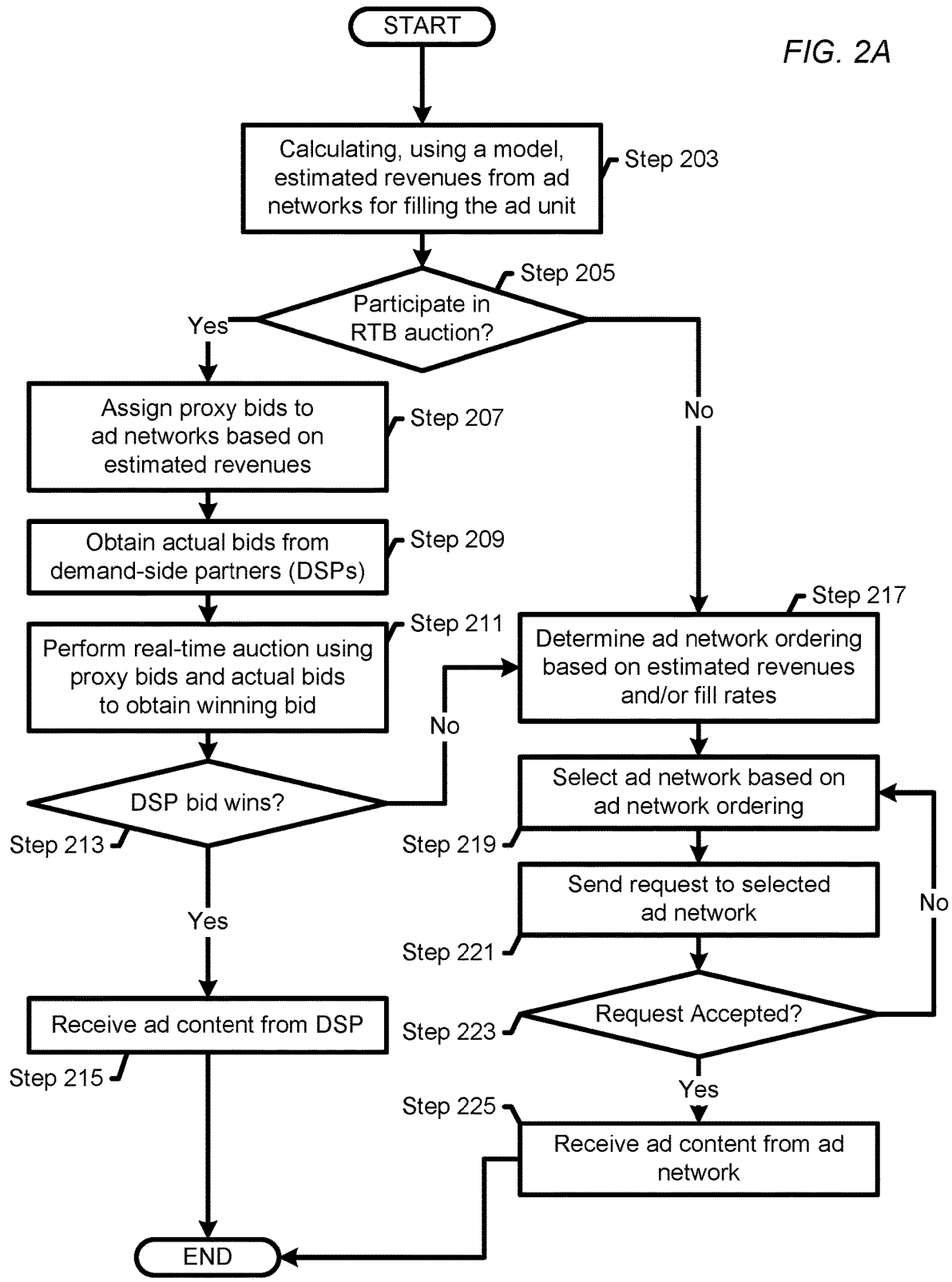
FIG. 2A and FIG. 2B show flowcharts in accordance with one or more embodiments of the invention.

FIG. 2A shows a flowchart for optimizing publisher revenue from one or more ad networks and/or demand-side platforms in accordance with one or more embodiments of the invention. FIG. 2A may provide the additional details for Step 153 in FIG. 1C. The process shown in FIG. 2A may be used, for example, with the system (100) of FIG. 1A and/or the system (199) of FIG. 1B to optimize publishers' ad revenue.

In Step 203, estimated publisher revenues (e.g., eCPM) from ad networks for filling the ad unit are calculated using a model. The model may be previously generated and obtained from storage or may be generated contemporaneously with the execution of this step.

In Step 205, a determination is made about whether to perform a RTB auction for the ad unit using an ad exchange. If the ad unit is to be auctioned, the process proceeds to Step 207. If the ad unit is not to be auctioned, the process proceeds to Step 217. This determination may be made based on publisher input (i.e., the publisher may "opt in" to RTB auctions). Other factors may be used to make the determination in step 205 without departing from the invention.

In Step 207, if it has been determined that the ad unit is to be auctioned, a proxy bid is assigned to participating ad networks based on the estimated revenue from each ad network for filling the ad unit, calculated according to Step 203. In one or more embodiments of the invention, proxy bids are assigned to ad networks because ad networks cannot otherwise participate directly in the ad exchange. In one or more embodiments of the invention, proxy bids are assigned to every ad network having an account for the publisher.

In Step 209, actual bids on the ad unit are obtained from one or more DSPs.

In Step 211, an RTB auction is performed using the proxy bids assigned to the ad networks and the actual bids obtained from the DSPs, and a winning bid is obtained. The winning bid may or may not represent the actual revenue received by the publisher, regardless of whether the winner successfully provides ad content in response to the fill request.

In Step 213, it is determined whether the winning bid belongs to a DSP. If a DSP wins the auction, the process proceeds to Step 215. If a DSP does not win the auction (e.g., the winning bid is a proxy bid for an ad network), the process proceeds to Step 217. A variety of auction mechanisms can be used to determine a winning bid (e.g., second-price auction), in accordance with various embodiments.

In Step 215, the winning DSP's ad content is sent to the ad server system in response to the fill request (Step 151). The ad content may be obtained from the DSP or may be obtained from storage if it has already been acquired by the ad server system.

In Step 217, an ordering of ad networks is determined based on at least the estimated revenues calculated in Step 203. The ordering may also be determined based on fill rates for the ad networks and/or any other relevant metric. If a RTB auction has been performed, the ordering of ad networks may be based on the proxy bids assigned to the ad networks, as the proxy bids were assigned based on the aforementioned estimated revenues.

In Step 219, an ad network is selected to receive a fill request based on the network ordering determined according to Step 217. In one or more embodiments of the invention, the first ad network in the ordering that has not yet received the fill request is selected.

In Step 221, a fill request is sent to the selected ad network. The request may include the aforementioned constraints for impressions that are compatible with properties of the ad unit, as well as the aforementioned data regarding the publisher or the application. These constraints may serve to disallow the selected ad network from serving the fill request if the network has no qualifying impressions available.

In Step 223, it is determined whether the fill request is accepted by the ad network; in other words, whether the ad network will send an impression in response to the fill request. The ad network may choose not to respond based on the fill request; for example, if the request indicates that the application is published only in the USA, an ad network representing only European advertisers may not respond to the request. If the fill request is not accepted, the process returns to Step 219 to send a fill request to another ad network based on the ordering. If the fill request is accepted, the process may proceed to Step 225.

In Step 225, if the fill request has been accepted by the selected ad network, ad content is received from the selected ad network in response to the request. In Step 227, the ad content is provided to the ad server system.

Figure 2B:
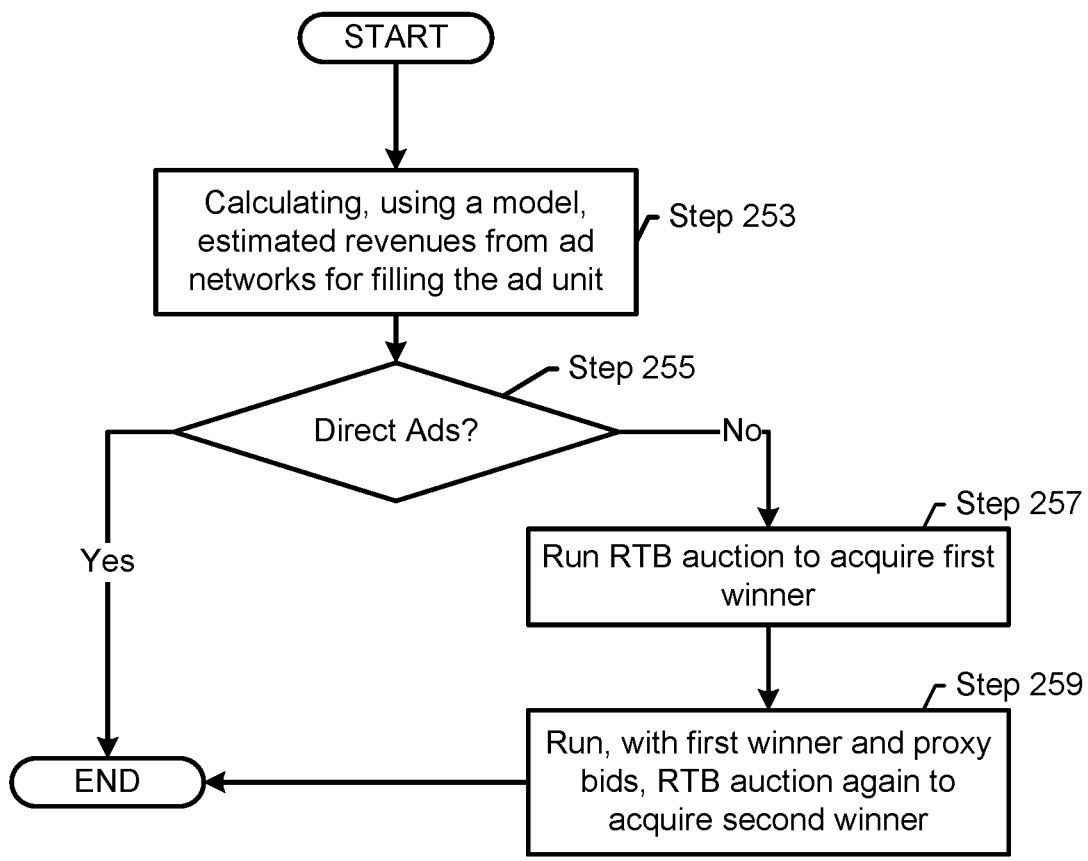

FIG. 2B shows a flowchart for optimizing publisher revenue from one or more ad networks and/or demand-side platforms in accordance with one or more embodiments of the invention. FIG. 2B may provide the additional details for Step 153 in FIG. 1C. The process shown in FIG. 2B may be used, for example, with the system (100) of FIG. 1A and/or the system (199) of FIG. 1B to optimize publishers' ad revenue.

In Step 253, estimated publisher revenues (e.g., eCPM) from ad networks for filling the ad unit are calculated using a model. The model may be previously generated and obtained from storage or may be generated contemporaneously with the execution of this step.

In Step 255, it is determined whether the publisher is running direct ads. When it is determined that the publisher is not running direct ads, the process proceeds to Step 257.

In Step 257, an RTB auction is run (discussed above) and the winner of the RTB auction is acquired.

In Step 259, a second RTB auction is run. However, this second auction uses the winner of the first RTB auction (i.e., Step 257) and proxy bods (discussed above). The winner of this second auction is required. The winner of this second auction is the selected ad source, discussed above in reference to Step 153 in FIG. 1C.

Figure 3:
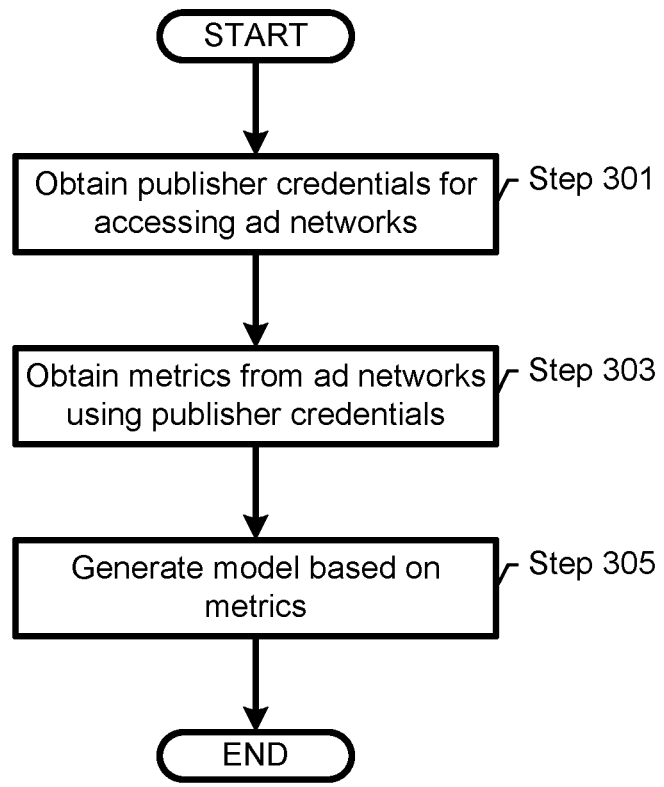
FIG. 3 shows a flowchart in accordance with one or more embodiments of the invention.

FIG. 3 shows a flowchart for building a model for estimating publisher revenue from one or more ad networks. The process shown in FIG. 3 may be used, for example, with the system of FIG. 1 to build a model for ad revenue estimation.

In Step 301, publisher credentials are obtained for accessing one or more ad networks. The publisher credentials may have been previously obtained by multiple publishers and stored for later retrieval. In one or more embodiments of the invention, when an individual publisher agrees to participate in the ad server system, the participating publisher may "opt in" to provide the publisher's credentials for accessing the ad networks.

In Step 303, metrics are obtained from the one or more ad networks using the publisher credentials. If the participating publisher provides its credentials, metrics for the participating publisher are obtained in addition to metrics for the multiple publishers. These metrics may include various KPIs and other metrics for previous transactions between the publishers and the ad networks.

In Step 305, a model is generated based on the metrics obtained, and the process proceeds to end. The model may be generated based on metrics for multiple publishers and/or the participating publisher.

Figure 5:
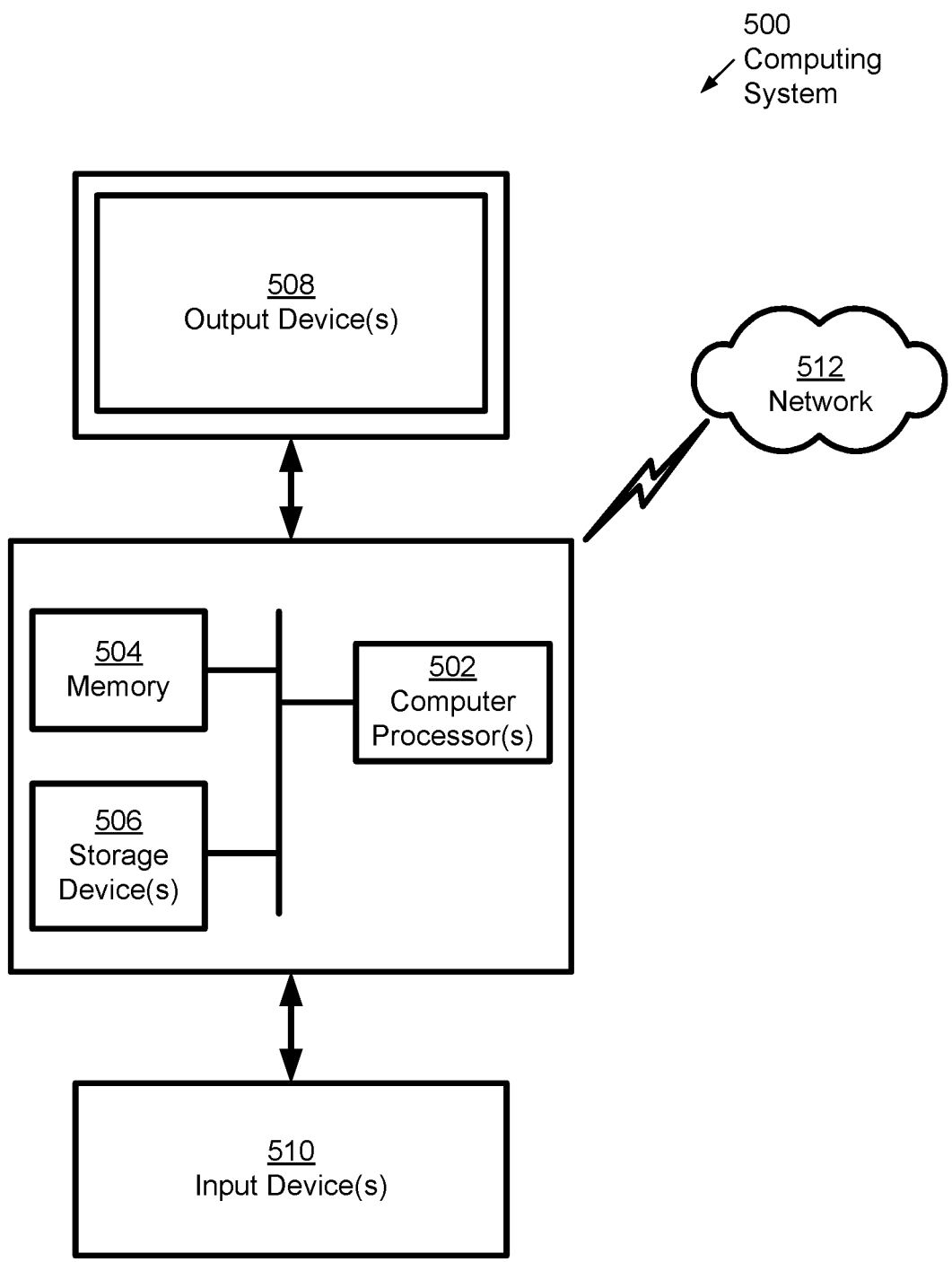
FIG. 5 shows a computing system in accordance with one or more embodiments of the invention.

Embodiments of the invention may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 5, the computing system (500) may include one or more computer processor(s) (502), associated memory (504) (e.g., random access memory (RAM), cache memory, flash memory, etc.), one or more storage device(s) (506) (e.g., a hard disk, an optical drive such as a compact disk (CD) drive or digital versatile disk (DVD) drive, a flash memory stick, etc.), and numerous other elements and functionalities. The computer processor(s) (502) may be an integrated circuit for processing instructions. For example, the computer processor(s) may be one or more cores, or micro-cores of a processor. The computing system (500) may also include one or more input device(s) (510), such as a touchscreen, keyboard, mouse, microphone, touchpad, electronic pen, or any other type of input device. Further, the computing system (500) may include one or more output device(s) (508), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (500) may be connected to a network (514) (e.g., a local area network (LAN), a wide area network (WAN) such as the Internet, mobile network, or any other type of network) via a network interface connection (not shown). The input and output device(s) may be locally or remotely (e.g., via the network (512)) connected to the computer processor(s) (502), memory (504), and storage device(s) (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (500) may be located at a remote location and connected to the other elements over a network (514). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for operating a server system to fill a first ad unit of a first application executing on a mobile device with a native advertisement, the first application and the native advertisement being displayed on a visual interface of the mobile device, the native advertisement including a plurality of assets and having a first format, the first format defining one or more visual characteristics specific to the first application and including an application-specific arrangement of at least some of the plurality of assets in the first ad unit customized to blend with the first application, the method comprising:
   receiving, by the server system, a request for the plurality of assets to fill the first ad unit with the native advertisement in the first format;
   receiving, by the server system and from an ad source over a network, ad content in a second format different than the first format of the native advertisement;
   converting, by a converter of the server system, the ad content in the second format to the plurality of assets in the first format to enable generation of the native advertisement from the plurality of assets by mapping at least a first portion of data in the ad content to at least one corresponding asset of the plurality of assets; and
   sending, by the server system, the plurality of assets to the first application, wherein the first application fills the first ad unit with the native advertisement comprising the at least one corresponding asset of the plurality of assets.

2. The method of claim 1, wherein the request is a uniform resource locator (URL) hit and comprises at least one parameter selected from a group consisting of an identification of the ad unit, an identification of a computing device executing the first application, and a type of connection between the computing device and the server system.

3. The method of claim 1, wherein:
   the request is a URL hit and comprises a parameter;
   the ad source selects the ad content to send to the server system based on the parameter; and
   the parameter is at least one selected from a group consisting of: a location of a computing device executing the first application, a keyword, and a type of content surrounding the ad unit in the first application.

4. The method of claim 1, wherein the plurality of assets comprises: a title for the native advertisement, a text string for the native advertisement, a URL identifying a location of an icon, a URL identifying a location of a main image for the native advertisement, call to action text, a click URL identifying a destination, an array of impression tracking URLs, and a click tracking URL.

5. The method of claim 1, further comprising:
   calculating, using a model, an estimated publisher revenue from each of a plurality of ad networks for filling the ad unit, wherein the estimated publisher revenue from each ad network is calculated based on: at least one of a plurality of historical requests received by at least one of the plurality ad networks, served ads by at least one of the plurality ad networks, actual costs-per-impression for at least one of the plurality ad networks, cost-per-click for at least one of the plurality ad networks, and/or other historical data;
   determining an ordering for the plurality of ad networks based on the estimated publisher revenue from each of the plurality of ad networks;
   sending the request to an ad network of the plurality of ad networks based on the ordering.

6. The method of claim 5, further comprising:
   assigning a plurality of proxy bids to the plurality of ad networks based on the plurality of estimated publisher revenues;
   obtaining at least one actual bid of a demand-side partner; and
   performing a real-time auction for the request using the plurality of proxy bids and the at least one actual bid, wherein the ad source is the demand-side partner.

7. The method of claim 1, further comprising:
   issuing, by a server system SDK executing on the mobile device also executing the first application, the request for the plurality of assets;
   receiving, by the server system SDK and from the server system, an identity of an advertisement (ad) network;
   issuing, by an SDK of the ad network executing on the mobile device and based on the identity received from the server system, a content request to the ad network for the plurality of assets;
   receiving, by the SDK of the ad network, the plurality of assets; and
   filling the first ad unit with the native advertisement comprising at least one of the plurality of assets.

8. The method of claim 7, wherein the request is a URL hit and comprises at least one parameter selected from a group consisting of an identification of the ad unit, an identification of a computing device executing the first application, and a type of connection between the computing device and the server system.

9. The method of claim 7, wherein:
   the request is a URL hit and comprises a parameter;
   the ad source selects the ad content to send to the server system based on the parameter; and
   the parameter is at least one selected from a group consisting of: a location of a computing device executing the first application, a keyword, and a type of content surrounding the ad unit in the first application.

10. The method of claim 7, wherein the plurality of assets comprises: a title for the native advertisement, a text string for the native advertisement, a URL identifying a location of an icon, a URL identifying a location of a main image for the native advertisement, call to action text, a click URL identifying a destination, an array of impression tracking URLs, and a click tracking URL.

11. The method of claim 1, wherein the first format comprises a particular ordering and a particular grouping of one or more assets of the plurality of assets specific to the first application.

12. The method of claim 1, wherein converting the ad content in the second format to the plurality of assets in the first format comprises:
   extracting data from the ad content;
   populating a plurality of entries of an asset table with corresponding portions of the data extracted from the ad content based on metadata associated with each portion of the data; and
   populating the first ad unit with entries from the plurality of entries of the asset table according to the first format.

13. A system, comprising a server system to fill a first ad unit of a first application executing on a mobile device with a native advertisement, the first application and the native advertisement being displayed on a visual interface of the mobile device, the native advertisement including a plurality of assets and having a first format, the first format defining one or more visual characteristics specific to the first application and including an application-specific arrangement of at least some of the plurality of assets in the first ad unit customized to blend with the first application, the server system comprising:
   a computer processor; and
   a memory storing instructions that are executable by the computer processor to:
   receives a request for the plurality of assets to fill the first ad unit with the native advertisement in the first format;
   receives, from an ad source and over a network, ad content in a second format different than the first format of the native advertisement;
   converts the ad content in the second format to the plurality of assets in the first format to enable generation of the native advertisement from the plurality of assets by mapping at least a first portion of data in the ad content to at least one corresponding asset of the plurality of assets; and
   sends the plurality of assets to the first application, wherein the first application fills the first ad unit with the native advertisement comprising the at least one corresponding asset of the plurality of assets.

14. The system of claim 13, wherein the request is a uniform resource locator (URL) hit and comprises at least one parameter selected from a group consisting of an identification of the ad unit, an identification of a computing device executing the first application, and a type of connection between the computing device and the server system.

15. The system of claim 13, wherein:
   the request is a URL hit and comprises a parameter;
   the ad source selects the ad content to send to the server system based on the parameter; and
   the parameter is at least one selected from a group consisting of: a location of a computing device executing the first application, a keyword, and a type of content surrounding the ad unit in the first application.

16. The system of claim 13, wherein the plurality of assets comprises: a title for the native advertisement, a text string for the native advertisement, a URL identifying a location of an icon, a URL identifying a location of a main image for the native advertisement, call to action text, a click URL identifying a destination, an array of impression tracking URLs, and a click tracking URL.

17. The system of claim 13, wherein the server system further comprises:
   an optimizer that:
   calculates, using a model, an estimated publisher revenue from each of a plurality of ad networks for filling the ad unit, wherein the estimated publisher revenue from each ad network is calculated based on: at least one of a plurality of historical requests received by at least one of the plurality ad networks, served ads by at least one of the plurality ad networks, actual costs-per-impression for at least one of the plurality ad networks, cost-per-click for at least one of the plurality ad networks, and/or other historical data;
   determines an ordering for the plurality of ad networks based on the estimated publisher revenue from each of the plurality of ad networks, and
   sends the request to an ad network of the plurality of ad networks based on the ordering.

18. The system of claim 17, wherein the server system further comprises:
   an ad exchange module that:
   assigns a plurality of proxy bids to the plurality of ad networks based on the plurality of estimated publisher revenues;
   obtains at least one actual bid of a demand-side partner; and
   performs a real-time auction for the request using the plurality of proxy bids and the at least one actual bid, wherein the ad source is the demand-side partner.

19. The system of claim 13, further comprising the mobile device, wherein the mobile device comprises:

a server system SDK, executing on the mobile device, that:
  executed the first application;
  issues the request for the plurality of assets; and
  receives, from the server system, an identity of a first advertisement (ad) network; and
an SDK of the first ad network, executing on the mobile device, that:
  issues based on the identity received from the server system, a content request to the first ad network for the plurality of assets; and
  receives the plurality of assets,
wherein the first ad unit is filled with the native advertisement comprising at least one of the plurality of assets.

20. The system of claim 19, further comprising:
an SDK of a second ad network executing on the mobile device; and
an optimizer, executing on the server system, that:
  calculates, using a model, an estimated publisher revenue from each of a plurality of ad networks for filling the ad unit, wherein the estimated publisher revenue from each ad network is calculated based on: at least one of a plurality of historical requests received by at least one of the plurality ad networks, served ads by at least one of the plurality ad networks, actual costs-per-impression for at least one of the plurality ad networks, cost-per-click for at least one of the plurality ad networks, and/or other historical data;
  determines an ordering for the plurality of ad networks based on the estimated publisher revenue from each of the plurality of ad networks; and
  selects the first ad network of the plurality of ad networks based on the ordering.

21. The system of claim 13, wherein the first format comprises a particular ordering and a particular grouping of one or more assets of the plurality of assets specific to the first application.

22. The system of claim 13, wherein the instructions executable by the computer processor to convert the ad content in the second format to the plurality of assets in the first format comprise instructions executable by the computer processor to:
  extract, from the ad content, data from the ad content;
  populate a plurality of entries of an asset table with corresponding portions of the data extracted from the ad content based on metadata associated with each portion of the data; and
  populate the first ad unit with entries from the plurality of entries of the asset table according to the first format.

23. A non-transitory computer-readable medium (CRM) storing instructions for operating a server system to fill a first ad unit of a first application executing on a mobile device with a native advertisement, the first application and the native advertisement being displayed on a visual interface of the mobile device, the native advertisement including a plurality of assets and having a first format, the first format defining one or more visual characteristics specific to the first application and including an application-specific arrangement of at least some of the plurality of assets in the first ad unit customized to blend with the first application, such that the server system:
  receives a request for the plurality of assets to fill the first ad unit with the native advertisement in the first format;
  receives, from an ad source and over a network, ad content in a second format different than the first format of the native advertisement;
  converts the ad content in the second format to the plurality of assets in the first format to enable generation of the native advertisement from the plurality of assets by mapping at least a first portion of data in the ad content to at least one corresponding asset of the plurality of assets; and
  sends the plurality of assets to the first application, wherein the first application fills the first ad unit with the native advertisement comprising the at least one corresponding asset of the plurality of assets.

24. The non-transitory CRM of claim 23, wherein:
the request is a uniform resource locator (URL) hit and comprises a parameter selected from a group consisting of: a location of a computing device executing the first application, a keyword, and a type of content surrounding the ad unit in the first application;
the ad source selects the ad content to send to the server system based on the parameter; and
the plurality of assets comprises: a title for the native advertisement, a text string for the native advertisement, a URL identifying a location of an icon, a URL identifying a location of a main image for the native advertisement, call to action text, a click URL identifying a destination, an array of impression tracking URLs, and a click tracking URL.

25. The non-transitory CRM of claim 23, wherein the first format comprises a particular ordering and a particular grouping of one or more assets of the plurality of assets specific to the first application.

26. The non-transitory CRM of claim 23, wherein the instructions that operate the server system to convert the ad content in the second format to the plurality of assets in the first format comprise instructions that operate the server system to:
  extract data from the ad content;
  populate a plurality of entries of an asset table with corresponding portions of the data extracted from the ad content based on metadata associated with each portion of the data; and
  populate the first ad unit with entries from the plurality of entries of the asset table according to the first format.

* * * * *